(12) United States Patent
Höhnke

(10) Patent No.: US 9,984,085 B2
(45) Date of Patent: May 29, 2018

(54) CLUSTER STORAGE SYSTEM, PROCESS FOR SECURE ERASURE OF DATA, AND COMPUTER PROGRAM PRODUCT

(71) Applicant: Fujitsu Technology Solutions Intellectual Property GmbH, München (DE)

(72) Inventor: Thorsten Höhnke, Königsbrunn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 339 days.

(21) Appl. No.: 14/378,419

(22) PCT Filed: Jan. 17, 2013

(86) PCT No.: PCT/EP2013/050842
§ 371 (c)(1),
(2) Date: Aug. 13, 2014

(87) PCT Pub. No.: WO2013/120647
PCT Pub. Date: Aug. 22, 2013

(65) Prior Publication Data
US 2015/0012982 A1    Jan. 8, 2015

(30) Foreign Application Priority Data

Feb. 14, 2012   (DE) .................. 10 2012 101 162

(51) Int. Cl.
*H04L 12/06*   (2006.01)
*G06F 12/14*   (2006.01)
(Continued)

(52) U.S. Cl.
CPC .. *G06F 17/30117* (2013.01); *G06F 17/30595* (2013.01); *H04L 63/08* (2013.01); *H04L 67/1097* (2013.01)

(58) Field of Classification Search
CPC ............ H04L 9/00; H04L 9/32–9/3297; H04L 63/04–63/0492; H04L 63/08–63/0892;
(Continued)

(56) References Cited

U.S. PATENT DOCUMENTS 7,636,764 B1    12/2009  Fein et al.
2009/0024663 A1*  1/2009  McGovern ............ G06F 21/577
(Continued)

OTHER PUBLICATIONS

Dave Hitz et al., "File System Design for an NFS File Server Appliance," Network Appliance, Inc., Sunnyvale, CA, 2005, TR 3002.
Yang Tang et al., "FADE: Secure Overlay Cloud Storage with File Assured Deletion," The Chinese University of Hong Kong, Jun. 22, 2010.

*Primary Examiner* — Ashok Patel
*Assistant Examiner* — Quazi Farooqui
(74) *Attorney, Agent, or Firm* — DLA Piper LLP (US)

(57) ABSTRACT

A cluster storage system includes a plurality of mass storage systems that provide storage capacity to store data blocks, middleware that provides a plurality of virtual storage pools for a plurality of users of the cluster storage system, at least one user interface that accesses the storage pool allocated to a user, wherein the middleware includes at least one erase algorithm for secure erasure of data blocks, the at least one user interface provides an erase function to erase the storage pool allocated to the user, and the middleware is configured to erase all user-allocated data blocks of the plurality of mass storage systems using the at least one erase algorithm and report the successful erasure via the user interface when the user calls up the erase function.

13 Claims, 3 Drawing Sheets

(51) Int. Cl.
*G06F 12/02* (2006.01)
*G06F 17/30* (2006.01)
*H04L 29/08* (2006.01)
*H04L 29/06* (2006.01)

(58) Field of Classification Search
CPC ............... H04L 67/1097; G06F 15/16; G06F 21/30–21/46; G06F 21/60–21/645; G06F 9/00; G06F 17/30117; G06F 17/30595
USPC .............................................. 726/5, 2, 4, 18
See application file for complete search history.

(56) References Cited

U.S. PATENT DOCUMENTS

| | | | |
|---|---|---|---|
| 2009/0100163 A1* | 4/2009 | Tsao .................... | H04L 67/1097 709/223 |
| 2009/0216973 A1* | 8/2009 | Nakajima ........... | G06F 11/1451 711/162 |
| 2010/0138619 A1* | 6/2010 | Benavides .......... | G06F 21/6218 711/159 |
| 2010/0332401 A1* | 12/2010 | Prahlad ............. | G06F 17/30082 705/80 |
| 2010/0332530 A1 | 12/2010 | McKelvie et al. | |
| 2011/0219049 A1* | 9/2011 | Zaitsev ................ | G06F 3/0623 707/822 |
| 2012/0027134 A1 | 2/2012 | Gladwin et al. | |

* cited by examiner

CLUSTER STORAGE SYSTEM, PROCESS FOR SECURE ERASURE OF DATA, AND COMPUTER PROGRAM PRODUCT

TECHNICAL FIELD

This disclosure relates to a cluster storage system, in particular a storage cloud comprising a plurality of mass storage systems to provide storage capacity for storing data blocks, middleware to provide a plurality of virtual storage pools for a plurality of users of the cluster storage system and at least one user interface to access the storage pool allocated to a user. The disclosure further relates to a process for secure erasure of data in a cluster storage system and to a computer program product comprising executable program code to carry out the process.

BACKGROUND

Due to the increasing cross-linking of computer resources via the Internet and the constantly increasing demands regarding available storage capacity, cluster storage systems, in particular what are known as "storage clouds," are increasingly being used instead of a local mass storage system to store large amounts of data. The term "cloud storage" is understood to mean in particular the storage of data in virtualized storage pools provided via a data network, in particular the Internet. Providers who specialize in providing IT services and operate cluster systems make available to a user, generally a commercial user of IT services, comparatively large storage capacities of the cluster system. By outsourcing the provision of the storage capacity to a service provider, a client can reduce the required hardware expense and organizational effort. The service provider can reduce the costs of providing the storage capacity by standardization and the effects of rationalization.

One problem in the use of storage clouds is that a client of the storage cloud provider has no physical control over the stored data and, as a general rule, is also unable to discover what parts of a complex cluster system the data is stored in. Particularly with regard to national data protection guidelines, this regularly presents a problem, if personal or business-critical data are to be stored on a cluster storage system. In particular, it often remains unclear what happens to data stored by the provider when a client of the IT service provider terminates the leased storage capacity.

One possible solution to the above-mentioned problem is to back up only encrypted data in the leased storage space. But secure encryption of large amounts of data requires considerable effort when storing and retrieving the stored data. In addition, advances in decryption technology mean that it is impossible to ensure with absolute certainty that stored data, once encrypted, cannot be decrypted in the future by an unauthorized third party.

It could therefore be helpful to identify other options for secure use of a cluster storage system.

SUMMARY

I provide a cluster storage system including a plurality of mass storage systems that provide storage capacity to store data blocks, middleware that provides a plurality of virtual storage pools for a plurality of users of the cluster storage system, at least one user interface that accesses the storage pool allocated to a user, wherein the middleware includes at least one erase algorithm for secure erasure of data blocks, the at least one user interface provides an erase function to erase the storage pool allocated to the user, and the middleware is configured to erase all user-allocated data blocks of the plurality of mass storage systems using the at least one erase algorithm and report the successful erasure via the user interface when the user calls up the erase function.

I also provide a process for secure erasure of data in a cluster storage system including authenticating a user in respect of the cluster storage system, selecting via a user interface of the cluster storage system an erase function that erases at least one storage area allocated to the authenticated user, determining storage blocks allocated to the at least one storage area of a plurality of mass storage systems by middleware of the cluster storage system, erasing the storage blocks allocated to the at least one storage area by at least one predetermined secure erase algorithm, and reporting the successful erasure of the at least one storage area to the authenticated user.

I further provide a computer program product including executable program code stored in a non-transitive storage device, wherein upon execution of the program code by a cluster computer of a cluster storage system the following steps are performed: authenticating a user, receiving via a user interface a request to select an erasure function for erasing at least one of the storage areas allocated to the authenticated user, determining storage blocks, allocated to the at least one storage area, of a plurality of mass storage systems by middleware of the cluster storage system, erasing the storage blocks allocated to the at least one storage area by at least one predetermined secure erase algorithm, and reporting the successful erasure of the at least one storage area to the authenticated user.

BRIEF DESCRIPTION OF THE DRAWINGS

Further advantages are disclosed in the appended claims and the following detailed description of selected examples. My systems, methods and products are explained in detail hereafter with reference to different examples by the appended figures.

LIST OF REFERENCE SIGNS

Figure 1:
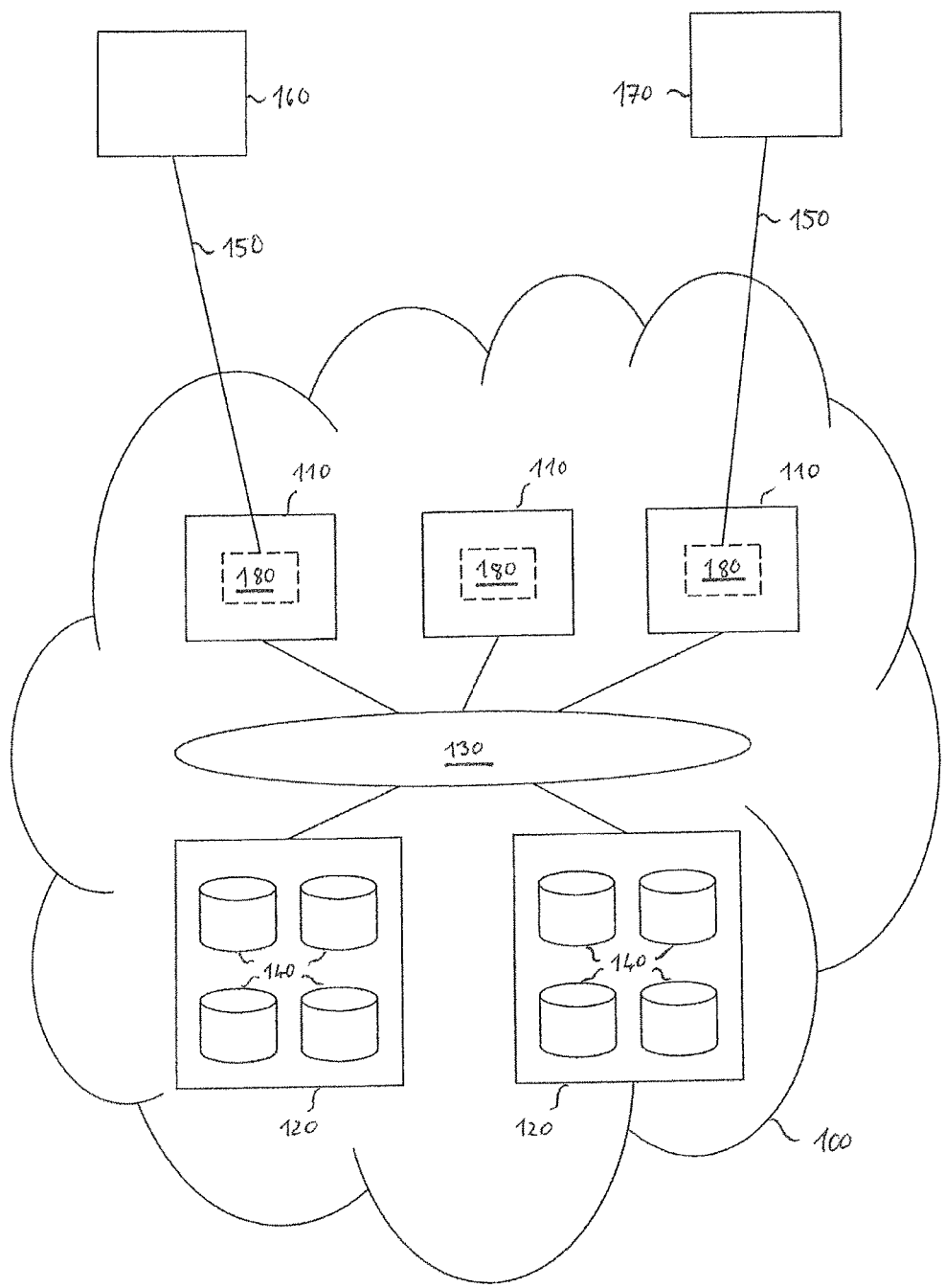
FIG. 1 shows a schematic representation of a cluster storage system.

100 Cluster storage system
110 Access server
120 Storage server
130 Internal data network
140 Mass storage system
150 External data network
160 Client computer
170 Cloud storage gateway
180 Virtual storage pool
200 Software architecture
210 Client software
220 Middleware
230 Storage back-end software
240 Interface
242 Interactive user interface
244 programming interface
250 Authentication module
260 Erase algorithm 270 Allocation table
280 Network file system
290 Storage resources

DETAILED DESCRIPTION

I provided a generic cluster storage system in which the middleware may comprise at least one erase algorithm for secure erasure of data blocks. The at least one user interface provides an erase function to erase the storage pool allocated to the user. Furthermore, the middleware is configured to erase all user-allocated data blocks of the plurality of mass storage systems using the at least one erase algorithm and report the successful erasure via the user interface when the user calls up the erase function.

By integrating an erase functionality in the middleware of a cluster storage system, data stored in a storage cloud can be securely erased as needed by a user of the cluster storage system. When the erase function is called up, the middleware serves in particular to identify all data blocks allocated to the user and erase them using the integrated erase algorithm. Reporting the successful erasure serves as evidence to the user that, in fact, all data made available has definitely been erased from the cluster storage system.

Preferably, the cluster storage system comprises a network file system such as, for example, what is known as the Write Anywhere File Layout (WAFL) to organize a plurality of data blocks of the plurality of mass storage systems in storage areas. Each storage area is here allocated to exactly one or to no storage pool of the plurality of storage pools. By implementing the erase function on the basis of a network file system used by the middleware, the middleware is able in a simple manner to determine all data blocks allocated to a user and, if necessary, erase them.

Advantageously, reporting the successful erasure comprises creation of a certificate, in particular creation of a digitally signed ISO 27001/2 Lead-Implementer Certificate. Such a certificate enables a user of a cluster storage system to be given legally relevant proof of compliance with data protection regulations.

I also provide a process for secure erasure of data in a cluster storage system, in particular a storage cloud. The process comprises the following steps:
  authenticating a user with respect to the cluster storage system;
  selecting via a user interface of the cluster storage system an erase function to erase at least one storage area allocated to the authenticated user;
  determining storage blocks, allocated to the at least one storage area, of a plurality of mass storage systems by middleware of the cluster storage system;
  erasing the storage blocks allocated to the at least one storage area by at least one predetermined secure erase algorithm; and
  reporting successful erasure of the at least one storage area to the authenticated user.

The steps enable a comprehensive and user-traceable erasure of data stored in a cluster storage system to be carried out.

I further provide a computer program product with executable program code, wherein upon execution of the program code by a cluster computer of a cluster storage system a process for secure erasure of data in the cluster storage system is carried out.

Turning now to the Drawings, FIG. 1 shows the architecture of a cluster storage system 100 in the form of a storage cloud. The cluster storage system 100 comprises a plurality of access servers 110 and a plurality of storage servers 120. The access servers 110 and the storage servers 120 are linked to one another via an internal data network 130, for example, a local data network (LAN) or storage network (SAN) based on what is commonly known as the fiber channel (FC) protocol.

The access servers 110 are, for example, what are commonly known as rack server computers or blade slide-in modules of rack or blade server systems known per se. The storage servers 120 are storage systems optimized for storing large amounts of data such as RAID systems, for example, or mass storage slide-in modules of blade server systems. In the example the access servers 110 are, for example, rack slide-in module servers of type PRIMERGY RX 200 S6 made by Fujitsu. The storage servers 120 are, for example, disc storage systems of type ETERNUS DX 60 S2 made by Fujitsu.

Each of the access servers 110 has one or a plurality of processors to respond to user requests. For example, requests of a user via a web interface or a programming interface (application programming interface API) can be answered via the access servers 110. What is commonly called middleware is run on the access servers 110 to respond to requests. The middleware can also provide further functions for control and access to the cluster storage system 100.

The storage servers 120 generally have a plurality of mass storage systems 140 such as in particular hard drives, magnetic and optical drives or magnetic tape stores. The individual mass storage systems 140 provide storage capacity in the form of data blocks used to store user data. For reasons of data security, it is customary to distribute a block of user data over several mass storage systems 140 physically independent of one another, and to file the data block at least partially redundantly to prevent loss of data in the event of failure of an individual mass storage system 140. Such techniques are known from what are commonly called RAID systems (Redundant Array of Independent Disks) and are therefore not described in detail here.

Access to the data stored in the cluster storage system 100 is generally effected via an external data network 150 such as in particular the global Internet. For this purpose, users of the cluster storage system 100 access, for example, via client computers 160, one of the access computers 110 directly or use what is commonly known as a cloud storage gateway 170, which translates local storage requests, for example, according to what is commonly called iSCSI protocol or according to the NFS protocol, into storage requests according to a programming interface provided by the cluster storage system 100, for example, what is commonly called the SOAP interface (Simple Object Access Protocol), and routes them to a corresponding interface of the access server 110.

From a logical point of view, in the cluster storage system 100 all data allocated to a user is allocated to a user-specific virtual storage pool 180. On a physical level, however, the data of a user is normally distributed over a plurality of mass storage systems 140.

Naturally, in addition to the architecture illustrated in FIG. 1 by way of example, a multiplicity of other architectures is possible to provide storage capacity. For example, the access computers 110 and/or the storage servers 120 can be distributed over a plurality of data processing centers, the individual data processing centers then each being linked via further networks, for example, the public Internet or private wide area networks (WANs).

Figure 2:
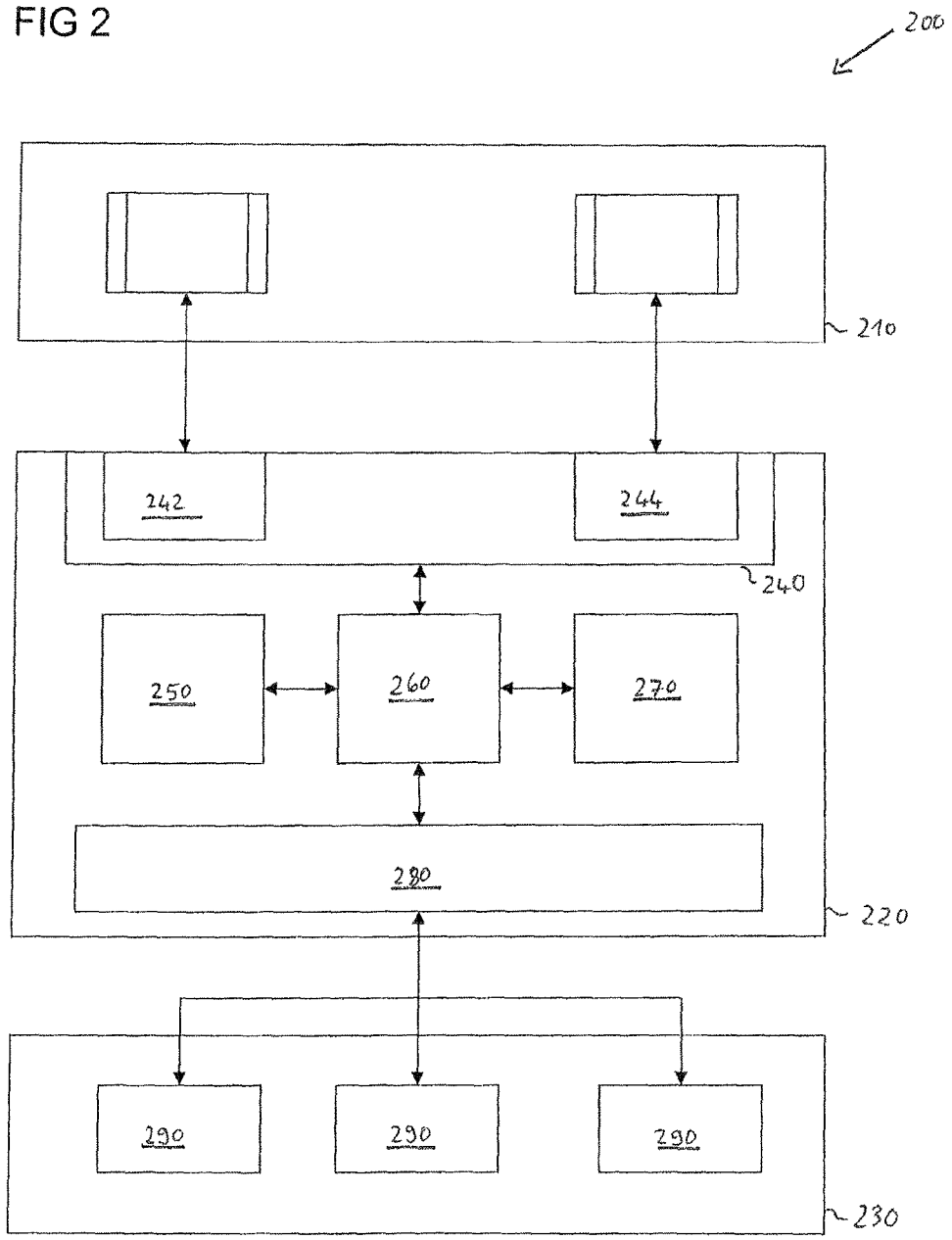
FIG. 2 shows a schematic representation of software architecture for the cluster storage system according to FIG. 1.

FIG. 2 shows an example of software architecture 200 to access data of the cluster storage system 100 according to FIG. 1.

The software architecture 200 is divided roughly into client software 210, middleware 220 and storage back-end software 230.

The client software 210 runs on a client computer 160 or a cloud storage gateway 170 and generates requests regarding data resources or other functionalities of the cluster storage system 100. For that purpose, the client software 210 sends suitable requests, for example, according to the HTTP protocol or the SOAP protocol, to an interface 240 of the middleware 220. In the illustrated example, the middleware 220 provides an interactive web-user interface 242 and a programming interface 244.

The middleware 220 further comprises an authentication module 250, an erase algorithm 260 for secure erasure of data and an allocation table 270. The particular storage blocks of the storage servers 120 allocated to a virtual storage pool 180 of a user authenticated by the authentication module 250 are filed in the allocation table 270. To organize the storage blocks provided by the plurality of mass storage systems 140, the middleware 220 uses a network file system 280. The network file system 280 is not a file system in the actual sense, i.e., a physical storage scheme for a mass storage, but rather an organization scheme for access to storage resources 290 provided by the storage back-end software 230 of the storage servers 120. For example, firmware of a RAID system can provide storage volumes via a Unix file system NFS (Network File System).

A network file system 280 suitable to integrate and administer a multiplicity of storage servers 120 and storage resources 290 in a cluster storage system 100 is, for example, the Write Anywhere File Layout (WAFL) developed by Network Appliance (NetApp). To improve the operational reliability and provide simplified archiving functions, in the WAFL file system different versions of a stored data file are available in what are commonly called "snapshots." In this case, only data file blocks that have actually been amended are re-stored in subsequent snapshots. With respect to the technical details of the WAFL file system, the reader is referred to the technical report TR 3002 of Network Appliance entitled "File System Design for an NFS File Server Appliance."

Figure 3:
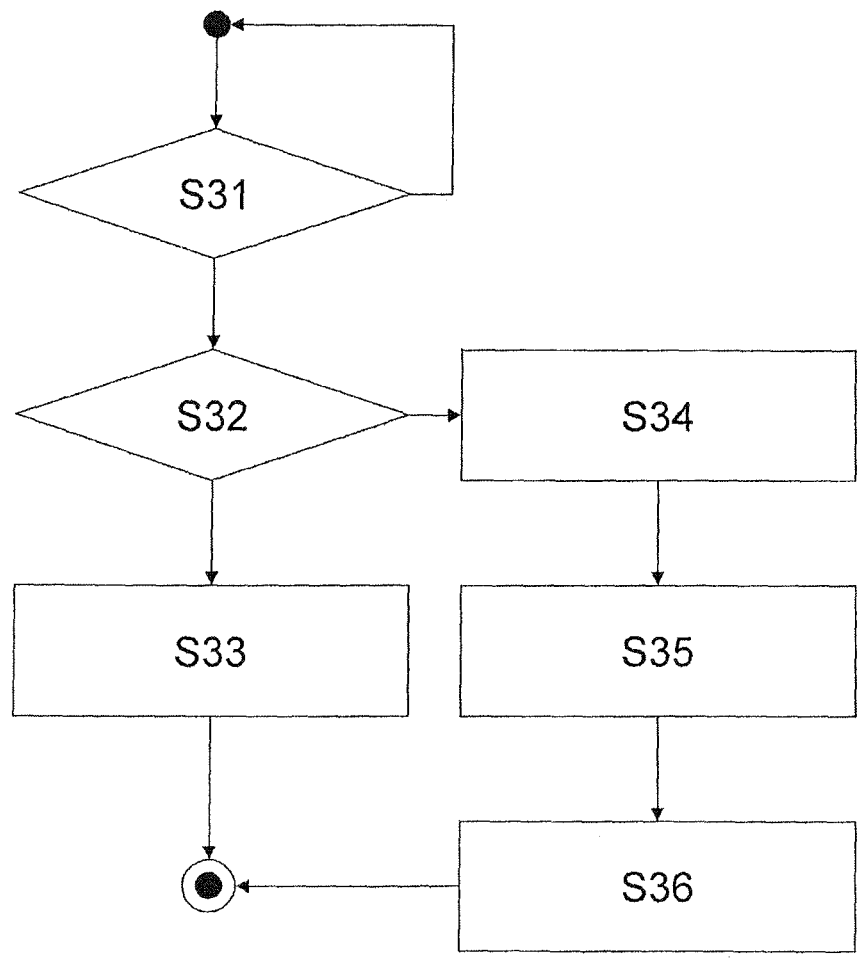
FIG. 3 shows a flow chart of a process for secure erasure of data.

With reference to FIG. 3, the operation of the cluster storage system 100 will be described, in particular when erasing storage space allocated to a user.

In a first step S31, authenticity of a user request is verified. For example, a user name and associated password which have been entered by a user via corresponding fields of the interactive user interface 242 are verified using data filed in a user database. Naturally, other authentication procedures are also possible such as, for example, authentication by digitally transmitted certificates. Until successful authentication has been effected, the process remains in step S31 and denies access to the cluster storage system 100.

After successful authentication, step S32 involves verifying whether the request of a user is directed to the erasure of data stored in the cluster storage system 100. If this is not the case, a different function selected by the user is carried out in step S33. For example, data requested by the user can be retrieved or data supplied by the user can be filed in one of the storage servers 120.

The steps of the cluster storage system 100 carried out in step S33 will not be discussed further here. In connection with the cluster storage system 100 described here it is important only that every time the middleware 220 allocates further data blocks for storage of user data to a virtual storage pool 180 this allocation is stored in a retrievable form for the middleware 220, for example, in the allocation table 270 or extended data file attributes of an underlying data file system. In this manner, the middleware 220 always maintains an overview of which of the data blocks of the plurality of storage servers 120 are allocated to an individual user or a storage pool 180.

If in step S32 it is determined that a user wishes to erase all of the relevant data stored in the cluster storage system 100, the middleware 220 determines in step S34 all data blocks allocated to a user. Depending on the internal organization structure of the middleware 220, the allocation table 270 and/or of the storage servers 120, the allocation can be produced in various ways. For example, it is possible to allocate to each user of the cluster storage system 100 a dedicated partition of the network file system 280 or an underlying storage resource 290. Naturally, a user can also be allocated several partitions of a network file system 280 or storage resources 290, in which case all identifiers of storage areas allocated to a user are stored in the allocation table 270. Of course, instead of partitions, other organization structures can also be used. In any case, the middleware 220 retrieves information that specifies directly or indirectly which data blocks of the plurality of the storage servers 120 are allocated to a user of the cluster storage system 100.

In a subsequent step S35, all data and data blocks identified in step S34 are erased by the middleware 220. For that purpose the middleware 220 transmits the address information determined in step S34 to a secure erase algorithm 260. In particular, a certified erase algorithm according to a recognized security standard can be used as erase algorithm 260. Guidelines for such security standards are published, for example, by the Bundesamt für Sicherheit in der Informationstechnik (BSI) (German Federal Office for Information Security) or by the US Department of Defense. If the middleware 220 comprises a plurality of secure erase algorithms 260, a user can also select a preferred erase algorithm 260. In particular the interactive user interface 242 of the middleware 220 can be used for that purpose.

In a step S36, the middleware 220 creates a digitally certified log relating to the implementation of the erasure of the data. For example, the middleware 220 can create what is commonly known as a Lead Implementer Certificate according to the international standard ISO 27001/2. Naturally, other recognized digital reports to confirm successful erasure can also be used. The report created by the middleware 220 is transmitted to the user via a suitable interface, in particular by transmitting the digitally certified report according to the FTP or HTTP protocol, with which the process terminates.

In addition to the example described above in detail, a multiplicity of other possible implementations of a secure erase function of a cluster storage system is of course possible.

For the provision of a corresponding functionality in general, inter alia the following changes to existing cluster storage systems are important:

1. Provision of a suitable user interface which enables a user of the cluster storage system to select an erase function.
2. The management of a storage location allocated to a user in a suitable storage structure, in particular in partitions of a network data file system, by the middleware.
3. The integration of a secure erase algorithm in the middleware.

4. The option to create a detailed report about the implementation of an erasure for a user of the cluster storage system.

The invention claimed is:

1. A cluster storage system comprising:
a plurality of mass storage systems that provide storage capacity to store data blocks;
middleware that provides a plurality of virtual storage pools for a plurality of users of the cluster storage system;
at least one user interface configured to access the storage pool allocated to a user;
wherein
the middleware comprises at least one erase algorithm for secure erasure of data blocks;
the at least one user interface provides an erase function to erase the storage pool allocated to the user;
the middleware is configured to erase all user-allocated data blocks of the plurality of mass storage systems using the at least one erase algorithm and report the successful erasure via the user interface when the user calls up the erase function; and
the cluster storage system is connected to the Internet and configured as a cloud storage system.

2. The cluster storage system according to claim 1, further comprising a network file system that organizes a plurality of data blocks of the plurality of mass storage systems in storage areas, wherein each storage area is allocated to exactly one or to no storage pool of the plurality of storage pools.

3. The cluster storage system according to claim 2, wherein the network file system allocates the storage blocks to disjoint partitions and the middleware allocates to each user a dedicated partition of the network file system.

4. The cluster storage system according to claim 2, wherein the network file system is configured to provide the middleware with address information for the data blocks allocated to a storage area, and the middleware is configured upon call-up of the erase function to determine the storage areas allocated to the storage pool to be erased and to transmit to the erase algorithm the address information provided by the network file system for the data blocks allocated to the determined storage areas.

5. The cluster storage system according to claim 1, wherein the middleware is configured to create a certificate relating to the successful erasure.

6. The cluster storage system according to claim 5, wherein the middleware is configured to create a digitally signed ISO 27001/2 Lead Implementer Certificate.

7. The cluster storage system according to claim 1, comprising a plurality of secure erase algorithms, wherein the at least one user interface is configured to allow the user a choice of the erase algorithm to be used for erasure from the plurality of erase algorithms.

8. The cluster storage system according to claim 1, wherein the at least one erase algorithm corresponds to one of German standard BSI-TL 03420 of the German Federal Office for Information Security (BSI), standard DOD 5220.22-M or standard DOD 5220.22-M ECE of the US Department of Defense.

9. A process for secure erasure of data in a cluster storage system comprising:
authenticating a user in respect of the cluster storage system;
selecting via a user interface of the cluster storage system an erase function that erases at least one storage area allocated to the authenticated user;
determining storage blocks allocated to the at least one storage area of a plurality of mass storage systems by middleware of the cluster storage system;
erasing the storage blocks allocated to the at least one storage area by at least one predetermined secure erase algorithm; and
reporting the successful erasure of the at least one storage area to the authenticated user,
wherein the cluster storage system is connected to the Internet and configured as a cloud storage system.

10. The process according to claim 9, further comprising:
logging the erasure procedure;
creating a certificate on the basis of the logged erasure procedure; and
transmitting the certificate to the authenticated user.

11. The process according to claim 10, wherein, in creating a certificate, a digitally signed Lead Implementer Certificate according to ISO 27001/2 is created.

12. The process according to claim 9, wherein authenticating is performed collaboratively by an IT service provider and a customer of the IT service provider, selecting is performed under the control of the customer of the IT service provider and determining, erasing and reporting are performed under the control of the IT service provider.

13. A computer program product comprising executable program code stored in a non-transitive storage device, wherein upon execution of the program code by a cluster computer of a cluster storage system, the following steps are performed:
authenticating a user;
receiving via a user interface a request to select an erasure function for erasing at least one of the storage areas allocated to the authenticated user;
determining storage blocks, allocated to the at least one storage area, of a plurality of mass storage systems by middleware of the cluster storage system;
erasing the storage blocks allocated to the at least one storage area by at least one predetermined secure erase algorithm; and
reporting the successful erasure of the at least one storage area to the authenticated user,
wherein the cluster storage system is connected to the Internet and configured as a cloud storage system.

* * * * *